United States Patent [19]

Strother, Jr.

[11] 4,439,532

[45] Mar. 27, 1984

[54] CASTING SLIP MADE FROM SPINEL AND SPINEL REFRACTORIES

[75] Inventor: Greene W. Strother, Jr., Brazoria, Tex.

[73] Assignee: The Dow Chemical Company, Midland, Mich.

[21] Appl. No.: 296,605

[22] Filed: Aug. 26, 1981

[51] Int. Cl.$^3$ ............................................. C04B 35/04
[52] U.S. Cl. ..................................... 501/117; 501/120
[58] Field of Search ................ 501/117, 120; 423/596, 423/600

[56] References Cited

U.S. PATENT DOCUMENTS

| | | | |
|---|---|---|---|
| 2,618,566 | 11/1952 | Robinson | 106/62 |
| 2,805,167 | 9/1957 | McCreight et al. | 106/62 |
| 3,516,839 | 6/1970 | Bruch | 106/62 |
| 3,530,209 | 9/1970 | Ho | 106/62 |
| 3,531,308 | 9/1970 | Bagley | 106/62 |
| 3,544,266 | 12/1970 | Palmour et al. | 106/62 |
| 3,567,472 | 3/1971 | Bratton | 106/62 |

FOREIGN PATENT DOCUMENTS

| | | | |
|---|---|---|---|
| 697231 | 9/1953 | United Kingdom | 501/120 |
| 449021 | 6/1975 | U.S.S.R. | 501/120 |

*Primary Examiner*—James Poer
*Attorney, Agent, or Firm*—G. R. Baker

[57] ABSTRACT

A spinel containing slip-casting composition, method for preparing the spinel slip-casting composition and method for casting the slip into usable forms are described. The spinel employed to prepare the castable slips is a pre-calcined spinel and a calcined spinel each prepared in the manner of copending application Ser. No. 184,189, filed Sept. 4, 1980, which is ball-milled with water, then mixed with a deflocculant at pH 9 or below. The slurry or "slip" is cast into a mold porous to water until the desired thickness of solid has been obtained and the excess "slip" decanted or otherwise withdrawn from the mold. The green shape is retained in the mold until it gains green strength, 1 hour to 5 days, and thereafter placed in an oven wherein it is fired to above about 1400° C. for from 1 to 20 hours until it has reached its maximum density of between about 50 and 99 percent of theoretical.

6 Claims, No Drawings

CASTING SLIP MADE FROM SPINEL AND SPINEL REFRACTORIES

BACKGROUND OF THE INVENTION

Spinels are well known minerals having the generic structure $M^I M_2^{II} O_4$ wherein $M^I$ represents one or more metal atoms having a valence such that when chemically bound with metal atoms of $M^{II}$, which may be one or more metal atoms the same as or different from $M^I$ but having a different valence, exhibit a total combined valence taking into account the number of atoms in the formula as to equal eight (8). In the ruby spinel iron, magnesium and aluminum combine in the generic formula as $Fe^{++}Mg^{++}(Fe^{+++}Al^{+++})_2O_4$. Man made spinels have also been made such as for example $Co^{++}(Co^{+++})_2O_4$, $Co^{++}(Al^{+++})_2O_4$, $MgAl_2O_4$, $(NiCo)Al_2O_4$, $(MgCo)Al_2O_4$ and the like.

Spinels disclosed in the prior art have been prepared by admixing the desired metals, as their oxides, in the theoretical proportions and heating them to temperatures above about 1500° C. where at no amount of continued heating at this temperature nor heating to a moderately higher temperature materially changes the density or crystalline structure. Of course extreme continued higher heating can change the crystalline structure to a structure not associated with the spinel structure. When spinels have been prepared in this manner the usual utility requires the spinel to be ground into a fine powder, mixed with a binder, shaped, and the binder burned out. Such techniques have produced shapes which have a degree of porosity about that of any conventional construction using a binder to maintain such shape during firing.

Most prior art techniques used commercially for preparing ceramic spinels employ the fusion technique of the metal oxides. This technique is not wholly satisfactory for the preparation of ceramic spinels because the metal atoms may not completely form into the spinel lattice structure due to poor batch stoichiometry; that is, some metal atoms form a segregated oxide phase admixed with the spinel lattice structure and once formed by fusion the crystals are not amenable to shaping by pressure and sintering without aid of binders which may be detrimental to acid and/or base resistance and physical properties of the finished product. Organic binders in ceramics made in this way make the body relatively porous when they are removed during or after shaping. Segregated ceramic binders may weaken the body because they are the site of differential expansion and contraction and/or chemical attack. The prior art also recognized the phenomena of spinel formation being a physio-chemical reaction based on thermal conditions such that, regardless of the ratio of the metals, some spinel lattice would form at the correct temperature, physical and chemical conditions, albeit those atoms not forming a spinel lattice structure remain as segregated phases of the metal oxides. The spinel shapes commercially available usually have been prepared from spinels produced from starting materials containing impurities or one or more segregated metal oxides phases and thus are relatively poor with respect to their physical properties, e.g., tensile strength, acid and/or base resistance and porosity.

Numerous patents and scientific literature have been published disclosing different techniques for preparing spinels (esp. $MgAl_2O_4$). Most procedures employ metal oxides or oxidizable compounds, both of which are converted to a spinel by firing or fusion with or without pressure.

In some patents a magnesium compound and an aluminum compound are mixed to give the requisite molecular constitution, wet ground and mixed, and fired at temperatures up to 3,000° F. (ca 1660° C.) as for example, in U.S. Pat. No. 2,618,566 or shaped before firing into pebbles as in U.S. Pat. No. 2,805,167.

Others use pure magnesia and alumina mixtures which are then fired at 2150° C. and cooled slowly overnight, (e.g. U.S. Pat. No. 3,516,839). Still others mix alumina with magnesium nitrate, dry fire on a schedule to 1400° C., and then ground to obtain a powder, (e.g. U.S. Pat. No. 3,530,209). Another technique follows the fusion route of magnesium nitrate hexahydrate and ammonium aluminum sulfate dodecahydrate (both reagent grade) to 1300° C. to produce a fine powder, (e.g. U.S. Pat. No. 3,531,308). A magnesium-salt ($MgSO_4.7H_2O$), aluminum-salt ($Al_2(SO_4)_3.18H_2O$) mixture, co-crystal has been employed to prepare a powder which is then shaped into ceramic bodies by hot press techniques with or without the use of binders, (e.g. U.S. Pat. No. 3,544,266).

Concomitant with these developments researchers investigated the nature of metal double hydroxides formed by coprecipitation, some of which were shown to convert to a spinel upon calcination. Early work was performed by Feitnecht and his students who made a series of double hydroxides with Mg/Al ratios between 1.5 and 4 to 1, respectively, by coprecipitation from magnesium and aluminum chlorides, Helv. Chim Acta 25, 106-31 (1942), 27, 1495-1501 (1944). No change could be detected by X-ray diffraction techniques then available for different Mg/Al ratios or a certain degree of substitution by chloride for hydroxide. A similar double hydroxide, reported to be a hydrate even after heating to 150° C., was reported by Cole and Hueber in "Silicates Industriels", Vol. 11, pp 75-85 (1957). The compound was made by the reaction of NaOH with Al metal or $Al_2(SO_4)_3$ and MgO or $MgSO_4$ at 65°-70° C. The product had a Mg/Al ratio of 4/1 even when reactant proportions were varied. However, $Mg(OH)_2$ was observed as a second phase in some cases.

More recently, Bratton in both Journal of The American Ceramic Society, Vol. 52, No. 8 (2969), and Ceramic Bulletin, 48, #8 pp 759-62 (1969) 48, 11, pp 1569-75, reported the coprecipitation of numerous magnesium and aluminium chlorides and oxalates which on heating, drying, calcining or firing, exhibited a spinel X-ray diffraction crystallographic pattern. The coprecipitation product resulted in a magnesium aluminum double hydroxide of composition $2Mg(OH)_2.Al(OH)_3$, plus a large amount of segregated gibbsite $Al(OH)_3$ phase (see also U.S. Pat. No. 3,567,472). This is presumably the same product Feitnecht obtained.

Bakker and Lindsay in "Ceramic Bulletin" Vol. 46, No. 11, pp 1095-1097 (1967) report that a high density spinel body can be made from $Mg(OH)_2$ and $Al(OH)_3$ if 1.5% $AlF_3$ is added as a mineralizer.

In the works cited above these powders were, in some instances, calcined then fired while in other instances the powders were heated through the calcining range and ultimately through the firing and even the fusion range. Early work was directed to preparing spinel usable as a decolorant, U.S. Pat. Nos. 2,395,931 and 2,413,184 or antacids, U.S. Pat. Nos. 3,323,992 and 3,300,277. In the last case a "highly hydrated magnesium aluminate" is claimed as a new composition of matter, the formula of which is $Mg(OH)_2 \cdot 2Al(OH)_3 \cdot XH_2O$ where X=4 to 8. The material is prepared by the reaction of $NaAlO_2$ ($Na_2Al_2O_4$), NaOH and $MgCl_2$ as aqueous solutions at a pH from 8–9. Bratton in U.S. Pat. No. 3,567,472 also discloses coprecipitation of a magnesium and aluminium chloride from a solution having a pH from 9.5 to 10, drying or firing to obtain a light-transmitting spinel by adding CaO.

While the pressure molding technique is commercially desirable for large shapes such as fire brick and the like, it would be advantageous to be able to slip-cast the spinel powders for use in making intricate shapes such as furnace ware, crucibles and the like. Previous attempts to slip-cast the spinel after firing the powders of course met with failure as did the first attempts to slip cast the precursor calcined spinel powders of our co-workers.

BRIEF DESCRIPTION OF THE INVENTION

The present invention concerns a casting slip comprised of a spinel or mixture of spinels including their precursor coprecipitate as an aqueous slurry with or without, binders, densification inhibiting additives and anti-flocculants suitable for casting in porous molds industrial shaped articles, industrial furnace ware, laboratory ceramic ware and the like. Of course, non-industrial shapes such as ceramic dinnerware or oven-proof ware can also be prepared.

In accordance with the present invention, a spinel of the general formula $$M^I M_2^{II} O_4$$

prepared in accordance with the procedures of copending application Ser. No. 184,189 filed Sept. 4, 1980, which is incorporated in its entirety herein, is calcined between about 400° C. and 1400° C., and preferably between about 900° C. and 1400° C., and a portion thereof sintered to above about 1500° C. and the mixture slurried in water with the aid of anti-flocculants, such as electrolytes derived from algae. The slurry is preferably an aqueous slurry having a solids content of from about 50 to 75% and more preferably 60 to 70%.

In addition, the sintered spinel (i.e. the calcined spinel above described heated above about 1500° C. for from 1 to 20 hours to complete densification) may be added to the slurry in amounts of from 0 to about 67% by weight of the total solids content of the slip.

Likewise the precursor for said spinels above set forth can be incorporated into the slurry to the extent of about 33% by weight of the total solids content of the slip.

It is to be understood that other metal oxides may be added to alter the densification of the finally sintered spinel structure and reduce shrinkage of the casting during sintering.

It is also to be understood that two or more different spinel compositions or precursors can be employed to prepare the slip, for example a $Mg(Cr. Al)_2O_4$ spinel can be used instead of the $MgAl_2O_4$ in part or in whole. Further $(MgFe)(Al.Fe)_2O_4$ spinels can be employed as the only spinel or as a component of a composite spinel slip composition.

One major difference of using the spinels of the present invention over previously prepared spinel slips is that organic binders are not necessary to obtain the green strength of the casting.

It is of course to be understood that while slip-casting has been described, centrifugal-casting or other forms of casting from slurries can be employed with equal success.

Suitable polyelectrolytes are those alkali metal and ammonium salts of carboxylated polyelectrolytes such as DARVAN® No. 7 and DARVAN® C respectively manufactured by R. T. Vanderbilt Company, Inc. which can produce a pH of solution or slurry of about 9 and below.

DETAILED DESCRIPTION OF THE INVENTION

It has now been found, for example, in accordance with Ser. No. 184,189, that if a magnesium compound such as, magnesium hydroxide, or the chloride, hydroxychloride, sulfate, phosphate, acetate, nitrate, halide, carbonate, bicarbonate, and the like, is coprecipitated with an aluminum compound, such as aluminum hydroxide, or the chloride or sulfate, at a pH to coprecipitate the compounds at least one of the metals is converted to its respective hydroxide or partial hydroxide during the coprecipitation followed by washing with or without alkalinity before recovering the coprecipitate there is obtained a product having the following composition upon drying at approximately 125° C. for several hours:

$$(1+z)M^I{}_b{}^a X_a{}^b \cdot 2M^{II}{}_d{}^c Y_c{}^d$$

wherein each X and Y is independently selected from the aforementioned anions and at least one X and/or Y is —OH and z represents a number less than 3 and preferably about 1, and where when z is greater than 0 there will be present at least one segregated phase, as for example in the magnesium-aluminum coprecipitate an aluminum phase of $Al(OH)_3$ and/or $AlO(OH)$, and wherein "a" times the number of atoms of $M^{I(b)}$ equals the valence b of X times a, the number of atoms of X, and similarly c times the number of atoms of $M^{II(d)}$ equals the valence d of Y times c, the number of the atoms of Y, the $M^{II}/M^I$ ratio in the total coprecipitate being maintained at about 2 to 1 respectively, and having a volatile content of about 40% by weight when a Cl atom is present and about 36% by weight when all the X and Y's are —OH moieties, (analysis by thermogravimetric analysis). The exemplified coprecipitate is not a hydrate and individual crystallites have $M^{II}/M^I$ ratios significantly different from those previously reported, for example when $M^{II}$ is aluminum and $M^I$ is magnesium, as shown by micro-area X-ray fluorescence, electron diffraction and high resolution X-ray diffraction. This composition is hereafter referred to as "precursor".

The dried precipitate is thereafter calcined at between about 400° C. and 1400° C. for from typically about 4 hours to about 1 hour, respectively. The calcined precipitate has an X-ray diffraction pattern of the spinel structure, for example, $MgAl_2O_4$. This product is referred to hereafter as "calcined spinel".

The calcined product, when heated above about 1500° C. for various periods of time is referred to hereafter as "sintered spinel".

EXAMPLE 1

A Mg/Al spinel prepared in accordance with the procedure of U.S. Pat. application Ser. No. 184,189 having an Al to Mg ratio by analysis 2.05 was calcined to 1300° C. and used hereinafter.

130 grams of 1300° C. calcined spinel was mixed with 78 grams of water and 15 grams of 25% active DARVAN ® 7 and milled in a ball mill for 1 hour. Thereafter the slip was cast into a 2-inch rectangular plaster mold. The casting demolded without cracking.

EXAMPLE 2

In a similar manner a spinel having an Al/Mg ratio of 1.99 and calcined to 1000° C. was formulated as above, milled then cast. The slip was slower to release and was difficult to demold.

Several additional slips were prepared employing precursor, calcined precursors of various heat history and calcined/sintered precursors. Good slips were prepared using DARVAN ® 7, 25% active, and the enumerated weight percent of the various forms of the precursor, calcined, and sintered precursor.

| | GRAMS | | | | |
|---|---|---|---|---|---|
| PRE-CUR-SOR | CALCINED (°C.) | (°C.) | SINTERED | $H_2O$ | DARVAN ® 7 25% ACT. |
| 3 | 5 | 5 (1000) | — | 5 | 13.3 | .7 |
| 4 | 4.3 | 8.5 (1000) | — | 22.6 | 14.1 | 1.7 |
| 5 | — | 7.5 (1000) | 3.8 (500) | 20 | 12.5 | 1.5 |

I claim:

1. A casting slip comprising a low viscosity slurry comprised of:
   (a) spinel of $M^I M_2^{II} O_4$ wherein $M^I$ is one or more metal atoms having a valence of 1, 2 or 4 present such that the atomic ratio of $M^I$ to $M^{II}$ is about 2, $M^{II}$ is the same or a different metal atom having a valence of 2, 3 or 6 different from $M^I$ present such that the total atomic ratio of $M^{II}$ is twice that $M^I$ said spinel being a mixture of spinel precursor calcined to between about 400° C. and 1400° C. and the same or a different spinel or batch of precursor calcined then fired (sintered) above about 1500° C., the calcined spinel being present in from about 10 to 100, of which up to 33% of the total composition may be precursor, and from zero to 67% by weight of sintered spinel, said spinels being present in said slurry to provide about 50 to 75 percent solids content, the balance being
   (b) water, and
   (c) from about 0.1 to 5% of an anti-flocculating agent.

2. The casting slip of claim 1 wherein said spinel is $MgAl_2O_4$.

3. The slip of claim 1 wherein said spinel is $MgAl_2O_4$ and is calcined to 1000° C.

4. The slip of claim 1 wherein said spinel is $MgAl_2O_4$ and is calcined to 1300° C.

5. The slip of claim 1 wherein said spinel is $MgAl_2O_4$, 33% by weight each of precursor, 1000° C. calcined spinel, and sintered spinel.

6. The slip of claim 1 wherein said spinel is $MgAl_2O_4$, 63.8% by weight of sintered spinel, 24% by weight of 1000° C. calcined spinel, and 12.1% by weight of 500° C. calcined spinel.

* * * * *